(12) United States Patent
Robillard et al.

(10) Patent No.: US 11,874,719 B2
(45) Date of Patent: Jan. 16, 2024

(54) MANAGEMENT OF PERFORMANCE AND POWER CONSUMPTION OF EDGE DEVICES

(71) Applicant: Dell Products L.P., Round Rock, TX (US)

(72) Inventors: Michael Robillard, Shrewsbury, MA (US); Amy N. Seibel, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/682,796

(22) Filed: Feb. 28, 2022

(65) Prior Publication Data
US 2023/0273665 A1   Aug. 31, 2023

(51) Int. Cl.
*G06F 1/32* (2019.01)
*G06F 1/3215* (2019.01)
*G06F 1/3287* (2019.01)

(52) U.S. Cl.
CPC .......... *G06F 1/3215* (2013.01); *G06F 1/3287* (2013.01)

(58) Field of Classification Search
CPC ...................................................... G06F 1/32
See application file for complete search history.

(56) References Cited

U.S. PATENT DOCUMENTS

| 11,297,161 | B1* | 4/2022 | Liu | G06F 9/5038 |
| 2019/0116128 | A1* | 4/2019 | Guo | H04L 67/101 |
| 2021/0109584 | A1* | 4/2021 | Guim | H04L 41/147 |
| 2021/0194988 | A1* | 6/2021 | Chaysinh | H04L 67/52 |

OTHER PUBLICATIONS

The Kubernetes Authors, "Workloads," https://kubernetes.io/docs/concepts/workloads/, Accessed Jan. 20, 2022, 2 pages.
S. J. Bigelow, "What is Edge Computing? Everything you Need to Know," https://www.techtarget.com/searchdatacenter/definition/edge-computing, Accessed Jan. 19, 2022, 11 pages.
U.S. Appl. No. 17/451,782, filed Oct. 21, 2021, and entitled "Use of IO Event Metadata to Enable Xaas Billing and Analytics."

(Continued)

*Primary Examiner* — Paul B Yanchus, III
(74) *Attorney, Agent, or Firm* — Ryan, Mason & Lewis, LLP (57) ABSTRACT

Techniques are disclosed for management of edge devices. For example, a method comprises coordinating operation of a plurality of edge devices in a system to process a plurality of workloads. The coordinating of the operation of the plurality of edge devices in the system comprises coordinating one or more times for changing a state of at least a subset of the plurality of edge devices from a first state corresponding to a first level of activity to a second state corresponding to a second level of activity. By way of further example, the coordinating of the operation of the plurality of edge devices in the system may further comprise coordinating one or more times for the processing of the plurality of workloads by at least the subset of the plurality of edge devices in the system.

20 Claims, 6 Drawing Sheets

(56) References Cited

OTHER PUBLICATIONS

U.S. Appl. No. 17/682,077 filed in the name of Amy N. Seibel et al., filed Feb. 28, 2022, and entitled "Edge Utility System with Dynamic Aggregation of Edge Resources Across Multiple Edge Computing Sites."

U.S. Appl. No. 17/682,323 filed in the name of Amy N. Seibel et al., filed Feb. 28, 2022, and entitled "Edge Utility System with Distributed Ledger Verification for Dynamic Aggregation of Edge Resources."

* cited by examiner

MANAGEMENT OF PERFORMANCE AND POWER CONSUMPTION OF EDGE DEVICES

FIELD

The field relates generally to information processing systems and, more particularly, to managing of edge devices in such information processing systems.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. In this manner, for example, network parameters such as bandwidth can be increased, while network parameters such as latency and congestion can be reduced, thus improving overall network reliability.

As economies and society become increasingly digitized, the need for energy efficiency becomes important, especially in edge computing architectures, which account for a significant percentage of electricity consumption. In addition, edge devices are being used in increasingly remote and rugged physical environments, which may have limited energy resources.

SUMMARY

Illustrative embodiments provide techniques for management of edge devices. For example, in one embodiment, a method comprises coordinating operation of a plurality of edge devices in a system to process a plurality of workloads. The coordinating of the operation of the plurality of edge devices in the system comprises coordinating one or more times for changing a state of at least a subset of the plurality of edge devices from a first state corresponding to a first level of activity to a second state corresponding to a second level of activity.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide techniques for the coordination of state changes (e.g., wakeup events) and other tasks (e.g., updates, backups, notification processing, etc.) across edge devices in a system based on operational periods that increase a performance to power ratio. Technical solutions illustratively described herein provide for the prediction of edge device usage and required power levels so the edge devices can be woken up and operated at times resulting in improved performance and power consumption.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising edge computing, cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
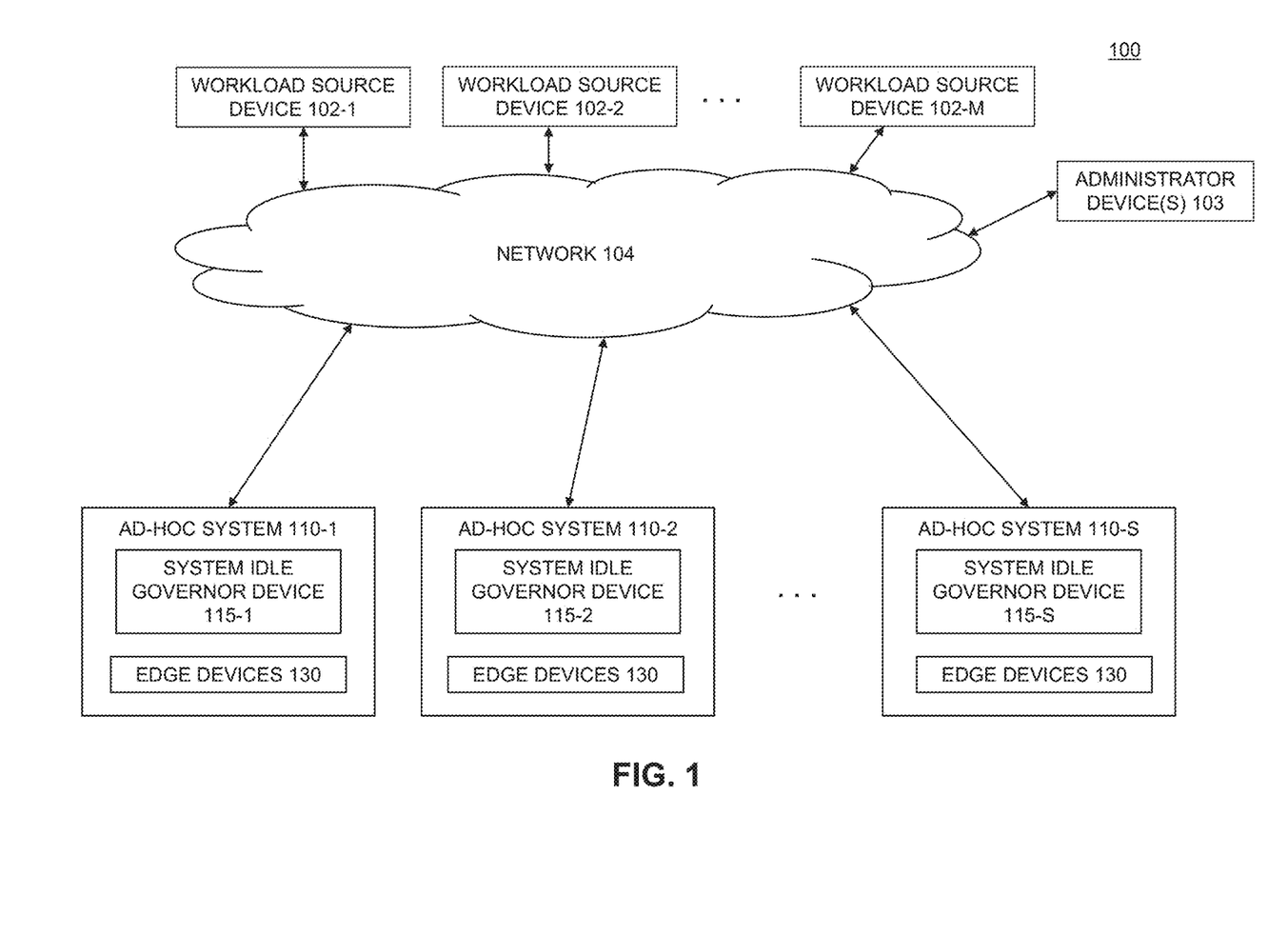
FIG. 1 is a block diagram of an information processing system configured for coordinating the operation of edge devices in an illustrative embodiment.

FIG. 1 shows an information processing system 100 configured in accordance with an illustrative embodiment for coordinating the operation of edge devices. The information processing system 100 comprises a set of workload source devices 102-1, 102-2, ... 102-M (collectively, workload source devices 102) which communicate over network 104 with respective ad-hoc systems 110-1, 110-2, ... 110-S (collectively, ad-hoc systems 110). The workload source devices 102 and the ad-hoc systems 110 may also communicate over the network 104 with one or more administrator device(s) 103. The ad-hoc systems 110 respectively comprise system idle governor devices 115-1, 115-2, ... 115-S (collectively, system idle governor devices 115) and multiple edge devices 130. The workload source devices 102 are devices from which workloads originate and/or are sent. The workloads are logical entities such as, for example, tasks, jobs, programs, applications, etc.

The workload source devices 102, administrator devices 103, system idle governor devices 115 and edge devices 130 can comprise, for example, Internet of Things (IoT) devices, desktop, laptop or tablet computers, mobile telephones, servers, storage devices or other types of processing devices capable of processing tasks and/or communicating with each other over the network 104. Such devices are examples of what are more generally referred to herein as "processing devices." Some of these processing devices are also generally referred to herein as "computers." The workload source devices 102, administrator devices 103, system idle governor devices 115 and edge devices 130 may also or alternately comprise virtualized computing resources, such as virtual machines (VMs), containers, etc. The workload source devices 102, administrator devices 103, system idle governor devices 115 and edge devices 130 in some embodiments comprise respective computers associated with a particular company, organization or other enterprise. The variables D, M and S and other similar index variables herein such as K, L and N are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. Compute and/or storage services (e.g., at least a portion of the available services and functionalities provided by the system idle governor devices 115 and edge devices 130) may be provided for users under a Platform-as-a-Service (PaaS) model, an Infrastructure-as-a-Service (IaaS) model, a Function-as-a-Service (FaaS) model, a Containers-as-a-Service (CaaS) model and/or a Storage-as-a-Service (STaaS) model, including cloud-based PaaS, IaaS, FaaS, CaaS and STaaS environments, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1, one or more input-output devices such as keyboards, displays or other types of input-output devices may be used to support one or more user interfaces to the workload source devices 102, administrator devices 103, system idle governor devices 115 and edge devices 130, as well as to support communication between the workload source devices 102, administrator devices 103, system idle governor devices 115 and edge devices 130 and/or other related systems and devices not explicitly shown.

Users may refer to customers, clients and/or administrators of computing environments for which coordination of the operation of edge devices is being performed. For example, in some embodiments, the administrator devices 103 are assumed to be associated with repair technicians, system administrators, information technology (IT) managers, software developers, release management personnel or other authorized personnel configured to access and utilize the ad-hoc systems 110.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols. As explained in more detail herein, the network 104 may implement one or more synchronization protocols such as, for example, network time synchronization protocol (NTP) and precision time protocol (PTP).

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The workloads provided by the workload source devices 102 comprise, for example, data and applications running as single components or several components working together, with the edge devices 130 providing computational resources to allow workloads to complete tasks. The size of a workload may be dependent on the amount of data and applications included in a given workload. Certain edge devices 130 may be better suited for certain types of workloads, depending on the characteristics of the workloads.

Figure 2:
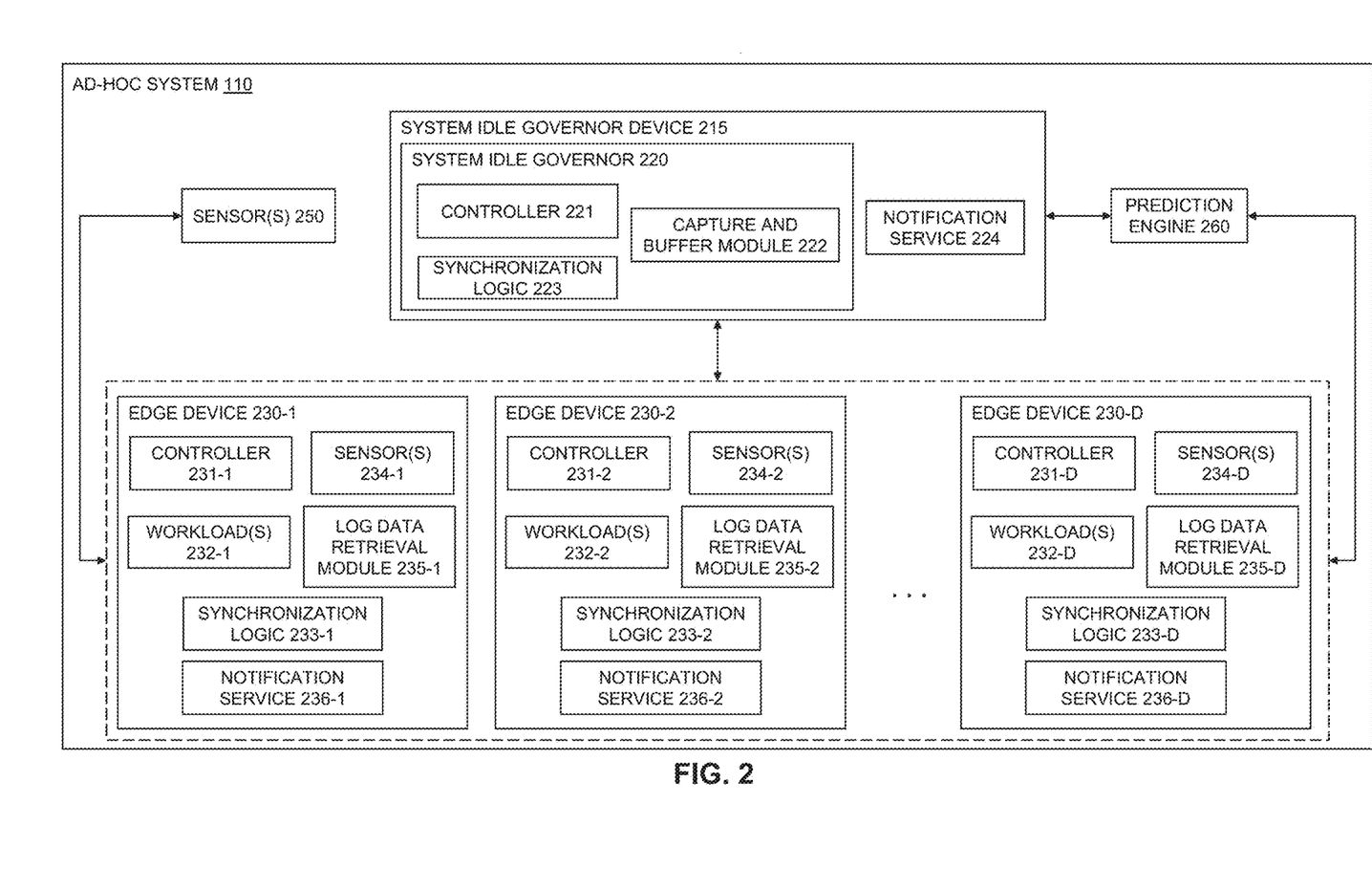
FIG. 2 shows an ad-hoc system configured for coordinating the operation of a plurality of edge devices in an illustrative embodiment.

Referring to FIG. 2, which illustrates an embodiment of one of the ad-hoc systems 110, an ad-hoc system 110 includes a system idle governor device 215 comprising a system idle governor 220 and edge devices 230-1, 230-2, . . . , 230-D (collectively, edge devices 230). The system idle governor device 215 and the edge devices 230 may be configured the same as or similarly to the system idle governor devices 115 and the edge devices 130 illustrated in FIG. 1. The system idle governor device 215 additionally comprises a notification service 224. The system idle governor 220 comprises a controller 221, a capture and buffer module 222 and synchronization logic 223. The edge devices 230 comprise respective controllers 231-1, 231-2, . . . 231-D (collectively, controllers 231), instances of synchronization logic 233-1, 233-2, 233-D (collectively synchronization logic 233), local sensors 234-1, 234-2, . . . 234-D (collectively sensors 234), log data retrieval modules 235-1, 235-2, . . . , 235-D (collectively, log data retrieval modules 235) and notification services 236-1, 236-2, . . . , 236-D (collectively, notification services 236). The edge devices 230 each execute one or more workloads 232-1, 232-2, . . . 232-D (collectively, workloads 232). The notification services 224 and 236 comprise software constructs respectively embedded in the system idle governor device 215 and the edge devices 230. For example, in accordance with one or more embodiments, the notification services 224 and 236 are part of the operating systems of the system idle governor device 215 and the edge devices 230. The ad-hoc system 110 further comprises remote sensor(s) 250 and a prediction engine 260.

Figure 3A:
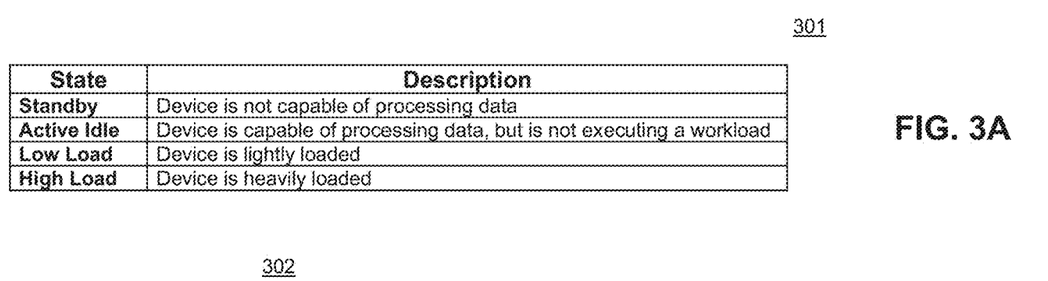
FIG. 3A is a table including edge device states and their corresponding descriptions in an illustrative embodiment.

As noted above, edge devices are being used in increasingly remote and rugged physical environments, where energy resources may be limited. In general, conserving power in edge devices is a function of the overall efficiency of devices and how the resources of the devices are used. For example, referring to the table 301 in FIG. 3A, edge devices 130/230 may be in multiple states such as, for example, "Standby," "Active Idle," "Low Load" and "High Load." In the Standby state, an edge device 130/230 is not capable of processing data. In the Active Idle state, an edge device 130/230 is capable of processing data, but is not executing a workload. In the Low Load state, an edge device 130/230 is lightly loaded (e.g., processing a relatively low number of workloads), and in the High Load state, an edge device 130/230 is heavily loaded (e.g., processing a relatively high number of workloads). As used herein, "waking," "waking up", "wakeup" or "wakeup event" are to be broadly construed to refer to, for example, changing a state of an edge device from a first state corresponding to a first level of activity to a second state corresponding to a second level of activity higher than the first level of activity. For example, referring to FIG. 3A, the first state may be a Standby state where data is not capable of being processed and the second state may be a High Load state where heavy data processing occurs, or another state having a higher level of processing capability than the Standby state (e.g., Active Idle and Low Load states).

There exists a technical problem with how to ensure that edge devices, which may be part of disaggregated ad-hoc systems, operate efficiently. The embodiments provide technical solutions for the coordination and orchestration of device wakeup events and workload processing within and between systems comprised of multiple edge devices so that the energy efficiency of individual edge devices and of edge device systems improves. More specifically, the embodiments provide techniques for system-wide edge device discovery and connection, system-wide coordinated edge device wakeup, the use of sensors to determine the types of edge devices in a system, energy efficient workload placement on edge devices, and the ability to make resource consumption and purchase decisions based on edge device energy consumption. In addition, in one or more embodiments, certain types of workloads can be assigned to edge devices predicted to be, scheduled to be, or currently in a certain state.

Figure 3B:
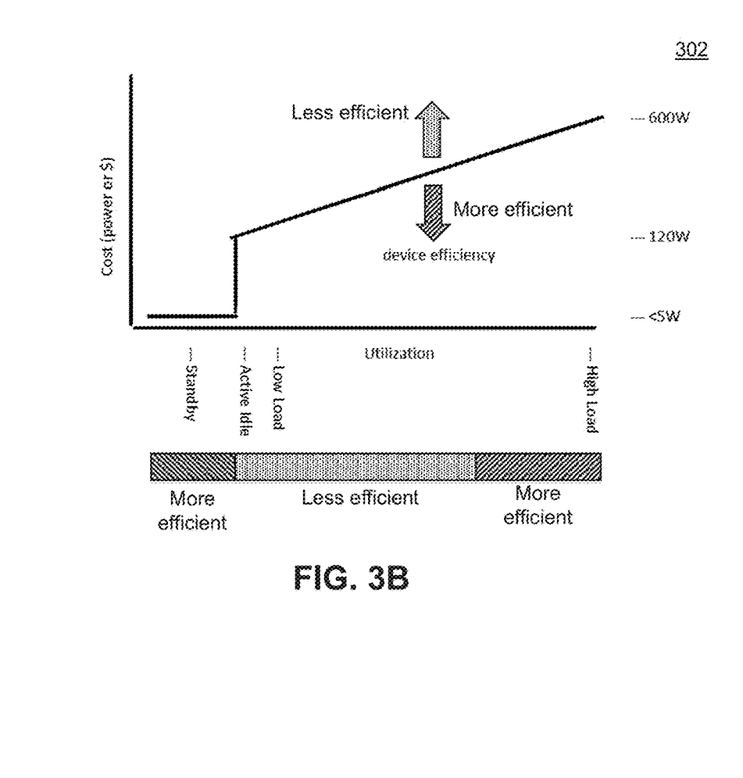
FIG. 3B is a graph of cost versus device utilization to illustrate energy usage in edge devices in an illustrative embodiment.
Figure 3C:
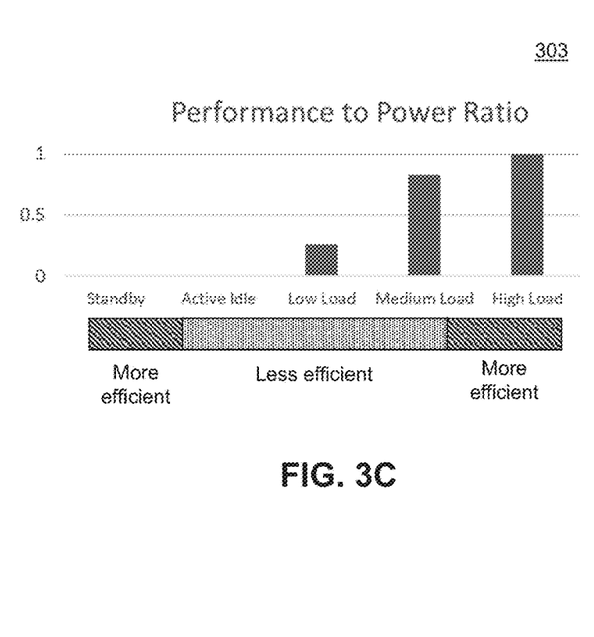
FIG. 3C is a graph of performance to power ratio for edge devices in an illustrative embodiment.

FIG. 3B is a graph 302 of cost versus device utilization to illustrate energy usage in edge devices, and FIG. 3C is a graph 303 of performance to power ratio for edge devices. As can be seen in the graph 302, edge devices (e.g., edge devices 130/230) are more efficient when in a Standby state (e.g., not capable of processing data) or when heavily loaded. Edge devices in Active Idle and Low Load states are less efficient. For example, when an edge device is capable of processing data, but is not executing workloads or executing a relatively small number of workloads, the edge device is using power but producing a relatively small output. However, when the edge device is capable of processing data, and is executing a relatively large number of workloads, although using power, the edge device is producing a relatively large output. When in a Standby state, although not producing an output, the edge device is using a relatively small amount of power.

In more detail, referring to the graph 303, the performance to power ratio, which is obtained by dividing performance (e.g., operations per second, input-output operations per second (IOPS), throughput, etc.) by power dissipation (e.g., Watts), is higher (at or near 1) and results in more efficient edge device operation at higher loads than at lower loads. Referring to both FIGS. 3B and 3C, edge devices (e.g., edge devices 130/230) that are in the active idle state or have low to medium loads are inefficient. To increase edge device efficiency, the embodiments provide techniques for using edge devices 130/230 when the edge devices 130/230 are heavily loaded, and otherwise maintaining the edge devices 130/230 in the standby state, where there is little to no power consumption.

Edge devices 130/230 utilize energy each time the device is woken up to, for example, check status, receive and/or transmit communications, monitor sensors (e.g., sensors 234/250) and/or execute workloads (e.g., workloads 232). The embodiments provide mechanisms for individual edge devices 130/230 and edge devices 130/230 in a system (e.g., ad-hoc system 110) to aggregate tasks to reduce power consumption. A technical problem exists in that as the number of edge devices in a network scale, their interactions, if uncontrolled can lead to excess power consumption. The embodiments provide a technical solution of increasing device efficiency by increasing coordination of operations between edge devices 130/230 at the system level. For example, the embodiments provide techniques to enable efficient power consumption at edge locations by forming ad-hoc systems 110 of edge devices 130/230 and coordinating wakeup events and other tasks at the individual device level and between multiple devices at the system level. Advantageously, the embodiments also synchronize edge devices 130/230 across a system (e.g., ad-hoc system 110) and determine times (e.g., date, day of week, time of day, etc.) at which the edge devices 130/230 are to be woken up to process workloads (e.g., workloads 232), and are to be subsequently returned to a standby state. The ability of edge devices 130/230 to apply the techniques of the embodiments to efficiently manage power consumption can be a criterion for edge device selection and/or purchasing decisions of edge device resources in collaborative and/or edge utility compute scenarios.

Referring back to FIG. 2, the notification services 224 and/or 236 serve as clearinghouses for events that will cause the edge devices 230 to change their wake states. For example, workloads 232 register notifications with the notification services 224 and/or 236. The notifications include, but are not necessarily limited to, alarms, local message notifications, remote message notifications, update notifications and sensor notifications. In one or more embodiments, at least some sensors 234 and/or 250 may comprise, for example, transducers such as, but not necessarily limited to, weather sensors (temperature, wind, humidity, etc.), operational sensors (e.g., tire pressure, speed, braking, impact, etc.), heat sensors, etc. The sensors 234 and/or 250 may also include global positioning system (GPS) sensors to provide alerts based, for example, on location and/or events related to location.

The notification services 224, 236 and the system idle governor 220 are responsible for managing the timing of the notifications to ensure that the edge devices 230 are able to sleep without being woken up continuously and for relatively longer periods of time than in conventional approaches. The notification services 224, 236 and the system idle governor 220 further ensure that efficiency and workload service level agreement (SLA) goals are met. The system idle governor device 215 communicates with multiple edge devices 230 within the ad-hoc system 110 to improve overall system efficiency.

In accordance with one or more embodiments, the system idle governor device 215 does not execute workloads 232. Alternatively, the system idle governor device 215 may execute workloads 232. The system idle governor 220 comprises a capture and buffer module 222 to capture and buffer notifications corresponding to the workloads 232 so that the notifications are not continuously sent to the edge devices 230 and causing the edge devices 230 to be woken up in an inefficient manner. For example, the capture and buffer module 222 captures and buffers asynchronous messages from workload source devices 102 external to the ad-hoc system 110 (e.g., external servers) and workload sources internal to the ad-hoc system 110 (e.g., sensors 234 and 250). The system idle governor 220 includes a controller 221, which, in addition to other functions described herein below, determines when the buffered notifications should be sent to the edge devices 230 to improve wake-up times and processing of workloads 232 by the edge devices 230 so that power is used efficiently.

When edge devices 230 wake (e.g., move from a standby state to a state where the edge devices are able to process workloads), the appropriate local client tasks are executed to retrieve the buffered notifications from the capture and buffer module 222, and process the workloads 232 corresponding to the notifications. Upon completion of workload processing, the edge devices 230 return to sleep (e.g., to the standby state) or potentially to a different state. The depth of the next level of inactivity may depend on how quickly the edge device 230 would need to wake up again. The system idle governor 220 remains in an active state to continue to capture and buffer incoming notifications.

In one or more embodiments, the assignment of the system idle governor device 215 can be executed via a round robin process between multiple edge devices 230, with one of the edge devices 230 assuming the operations of the system idle governor device 215. For example, upon waking a given edge device 230 that is currently not tasked with operating as the system idle governor device 215, the capturing and buffering, as well as other functionality associated with the system idle governor 220 can be transferred the given edge device. In the embodiments, the mechanism for system idle governor device selection is a function of overall system design and the type of intermediate buffering being performed.

In one or more embodiments, the types of notifications monitored, captured and buffered by the system idle governor 220 may be specified in a policy, and may be based, at least in part, on the type of device to which the notifications are being sent. The policy may be configured by a person (e.g., administrator via an administrator device 103), may conform to the terms of an SLA, and/or may be determined using machine learning or other automated process, with the option for human feedback. The policy may also include other related information, such as priority of different notification types.

The notifications, which correspond to a plurality of workloads 232, are received from the workload source devices 102 and/or sensors 234 and 250. The notifications are captured and buffered by the system idle governor 220 to coordinate operation of the edge devices 230 in the ad-hoc system 110 to process the workloads 232. The coordinating of the operation of the edge devices 230 in the ad-hoc system 110 comprises coordinating times for waking of the edge devices 230 from a standby state and for the processing of the workloads 232 by the edge devices 230. For example, referring back to FIG. 3C, the coordinating of the operation of the edge devices 230 in the ad-hoc system 110 is based, at least in part, on increasing a ratio of edge device performance to edge device power dissipation. In one illustrative embodiment, the ratio of edge device performance to edge device power dissipation may be maximized.

The edge devices 230 connect to an edge network (e.g., at least part of network 104). The terms of the connection, and any centralized device access, may be governed by privacy policies, employment agreements, or other policies or regulations. Depending on the implementation, the network connection can be implemented in several ways, such as via a user interface and/or user profile or via an application programming interface (API). As part of the network connection process, referring to the instances of synchronization logic 233 on the edge devices 230, synchronization capability will be installed, run on or otherwise made available to the edge devices 230 to synchronize a relative time across the edge devices 230 in the ad-hoc system 110. The purpose of the synchronization capability is to ensure that there is an accurate sense of relative time across the network of edge devices 230, in order to support device wakeups at intended times.

In one or more embodiments, network latency may need to be accounted for in determining when to begin a wakeup process. For example, instances of synchronization logic 223 and 233 in the system idle governor 220 and in the edge devices 230 may send test packets to gauge the round trip times (RTTs), and perform computations to determine the amount of buffering needed prior to initiating wakeup requests. Test packet transmission may occur at regularly scheduled intervals, or within certain time periods of initiating wakeup requests, without necessarily causing additional device wakeups. Alternatively, a certain amount of buffer time may be included with wakeup requests in order to ensure that wakeup events occur at the correct time. In other words, device wakeup requests may be received with a built-in delay period for delayed implementation. In other implementations, the instances of synchronization logic 223 and 233 comprise network synchronization capability based, at least in part, on beacons, magic packets and/or some other unique or specialized signaling in combination with dedicated hardware at the network interface.

Some examples of network synchronization techniques applied by the instances of synchronization logic 223 and 233 include, but are not necessarily limited to, NTP and PTP. NTP is a software based, standard time synchronization protocol, which calculates time in one-second and one-millisecond fractions. PTP is a hardware-based protocol that measures times in fractions such as microseconds, nanoseconds and possibly picoseconds. Depending on the network being employed, there may be other native synchronization capabilities available.

The above-noted policy (or policies) may control how the operation of the edge devices 230 in the ad-hoc system 110 is coordinated. The policy may include constraints based on, for example, a type of respective ones of the edge devices 230, priority of respective ones of the notifications and a threshold number of the notifications to be received before enabling the operation of the edge devices 230. In one or more embodiments, the design and implementation of policies for coordinating the operation of the edge devices 230 in the ad-hoc system 110 is based, at least in part, on one or more machine learning models applied by a prediction engine 260. Although shown as an independent component in FIG. 2, in other embodiments, each edge device 230 may comprise individual instances of a prediction engine 260.

In an illustrative embodiment, metadata corresponding to the notifications is logged by the log data retrieval modules 235, which input the metadata to the one or more machine learning models of the prediction engine 260. The one or more machine learning models are configured to predict, for example, when new notifications for the edge devices 230 will be issued, priority of the notifications, dependencies between the notifications, dependencies between the edge devices 230, and one or more times for waking the edge devices 230 which reduces a number of wakeup times for the edge devices 230. The one or more machine learning models are also configured to predict on which edge device 230 to place workloads based, for example, on edge device capabilities and/or constraints in an edge as a utility scenario. The machine learning models may comprise, for example, convolutional neural networks (CNNs), federated learning models, decision trees and other applicable machine learning techniques.

Depending on the implementation, the logs can be securely stored locally or externally to an edge device 230. In some cases, sensitive metadata (e.g., data that might identify a user) could be omitted from the logs or replaced by another identifier (such as a globally unique identifier (GUID)). Sensitive usage or predictive data in this scenario could similarly be transformed or obscured.

Inputs to the one or more machine learning models of the prediction engine 260 comprise, for example, a type of one or more of the edge devices 230 in the ad-hoc system 110, a type of one or more of the notifications, a type of one or more wakeup events, a predetermined priority of one or more of the notifications or wakeup events, a current sleep level (e.g., standby, active idle) of one or more of the edge devices 230, one or more historical sleep levels of one or more of the edge devices 230, and a current time (e.g., a time synchronized according to a synchronization technique described herein). Additional inputs to the one or more machine learning models of the prediction engine 260 comprise, for example, historical data about waking events (or other state changes) of one or more of the edge devices 230 including, but not necessarily limited to, when certain wakeup types have occurred in the past (e.g., date, day of week, time of day, etc.), circumstances triggering past wakeup events (or other state change events), and historical power consumption in connection with notification types, wakeup event types and processed workloads 232. State change events may include, for example, a change from for example, a first state of lower level activity to a second state of higher level activity, and vice versa. Other inputs to the one or more machine learning models of the prediction engine 260 comprise, for example, characteristics of workloads 232 (e.g., time constraints for completing the workloads 232), data concerning when workload volume from external workloads is likely to be high, related devices (e.g., within a complex edge device such as a connected vehicle or within a network), and tasks or workloads 232 other than a given task or workload 232 such as, for example, updates that need to occur on the edge device 230 in parallel or as a prerequisite to performing the given task or workload 232.

As noted above, the one or more machine learning models are configured to predict, for example, when new notifications for the edge devices 230 will be issued, priority of the notifications (if not predetermined), associations or dependencies between the notifications, associations or dependencies between the edge devices 230, and one or more times for waking the edge devices 230 which reduces a number of wakeup times for the edge devices 230. Outputs of the one or more machine learning models of the prediction engine 260, which are used by the system idle governor 220 when coordinating operations of the edge devices 230, further comprise, for example, likely edge device usage (e.g., which workloads 232 to be processed by the edge device 230), likely required power needed to process the workloads 232 and additional system devices (whether edge devices 230 or otherwise) to consider when initiating wakeups.

In one or more embodiments, the prediction engine 260 determines multiple possible wakeup times of the edge devices 230 based on improved energy consumption. For example, the output of the prediction engine 260 may include secondary, tertiary or lower ranked wakeup times for edge devices 230 in the event that a first proposed wakeup time does not work for a given edge device 230 or group of edge devices 230. The output of the prediction engine 260 may further indicate when to implement workloads 232 or other tasks such as, for example, system-level updates, so that they align with edge device wakeup times, and indicate in which state the edge devices 230 should be left after a wakeup event. When predicting the times for waking and/or operating the edge devices 230, the machine learning model(s) further take into account any buffering or latency delays that may occur prior to or after initiating a wakeup request, other events (e.g., updates) that are likely to be scheduled, and advantageous time(s) for such events to occur, as well as the ability and/or capacity of the edge devices 230 to process the workloads 232. The machine learning model(s) are further configured to continuously learn based on feedback provided to the machine learning model(s) following wakeup events and/or processing of workloads 232 by the edge devices 230. Feedback provided to the prediction engine 260 comprises, for example, the number of additional wakeup events or notifications occurring within a given amount of time from a scheduled wakeup event, the number of workloads 232 occurring within a given amount of time from the scheduled wakeup event, metrics of actual device usage at or near the scheduled time of the wakeup event and actual power usage at or near the scheduled time of the wakeup event. Such feedback may be provided from the edge devices 230, the system idle governor 220 and/or the notification services 224, 236. In one or more embodiments, feedback inputted to the machine learning model(s) further comprises data on user satisfaction and/or frustration regarding their wakeup experience (e.g., provided via a user interface with a ratings system on an administrator device 103 or other delivery mechanism).

As shown in FIG. 2, there are multiple levels of controllers 221 and 231. For example, a controller 221 is a component of the system idle governor 220, and controllers 231 are components of edge devices 230. Although not shown, there may be additional controllers controlling the notification services 224 and 236.

The controller 221 monitors and controls operations of the system idle governor 220 and can monitor operations of the prediction engine 260. According to an embodiment, the controller 221 monitors device wakeup signals and/or event prediction engines across various edge devices 230 in an ad-hoc system 110. For example, a server may need to contact many different edge devices 230. The controller 221 can improve the timing, and thus the power consumption, for the server and the individual edge devices 230. In some illustrative embodiments, improvement can be optimal, although embodiments are not limited to maximum and minimum results.

The controllers 231 monitor and control operations for an edge device 230, including controlling wakeup events and workload processing within an edge device 230 to improve energy efficiency. Controllers 231 can also signal to the edge device 230 what power state it should return to after a wakeup event and/or workload processing.

In the case of complex edge devices, such as connected vehicles, there may be coordination among various sensors 234, 250 and parts of the edge device 230. In some embodiments, an additional controller (not shown) is provided to coordinate the waking up of the various components within a complex edge device 230.

Controllers 221 and/or 231 can improve the timing of workloads 232, such as, but not necessarily limited to, updates or alerts, so that the workloads 232 coincide with the wakeup events to avoid unnecessary power consumption. Controllers 221 and/or 231 may also postpone lower priority workloads 232 until times with a better performance to power ratio.

The energy gains resulting from application of the embodiments could be advertised to potential users of the edge devices 130/230 and may be a reason for users to decide to use or purchase resources from edge devices 130/230 (e.g., in a collaborative compute or edge utility scenario).

In a non-limiting operational example applying the embodiments discussed hereinabove, a vehicle connected to a network (e.g., network 104) represents a complex edge device with many different components to coordinate. A network of connected vehicles, as well as associated servers and devices, can achieve power improvement by coordinating the operation of the complex edge devices and associated components to limit waking to relatively few select times in order to respond to notifications. Such notifications may correspond to workloads such as, for example, checking on/off and/or vehicle component statuses, checking for required repairs, checking for the need to offload data, and/or assigning new routes and/or other global positioning system (GPS) settings. The embodiments control, for example, waking, operation and sleep states of the complex edge devices and associated components to improve energy consumption.

In another non-limiting operational example, the technical solutions provided herein are applied to collaborative and utility edge compute environments, which require knowledge of which edge device resources are available for consumption. Acquiring such knowledge may require waking up the edge devices 130/230 to determine whether the edge devices 130/230 have available resources, or whether overflow capacity is required. The techniques described herein enable the coordination of such availability checks at the edge device or system level, as well as the coordination of when the edge devices 130/230 will receive and execute workloads 232, such that workload transfers and task execution are aligned with energy efficient wake periods for the edge devices 130/230. The embodiments further facilitate workload transfer and task execution to edge devices 130/230 that are already in the correct state to receive and execute workloads 232.

In another non-limiting operational example, the technical solutions provided herein could be used to provide a criterion for decision making about placement and/or purchasing of edge device services and/or edge device resources. For example, a user, through a user interface for the purchase of edge device services and/or edge device resources, could set a policy requiring edge devices employing the techniques of the embodiments disclosed herein.

In another non-limiting operational example applying the embodiments discussed hereinabove, the technical solutions provided herein coordinate the wake periods for smart edge devices within a user's home. For example, a system idle governor 220 and prediction engine 260 coordinate the wake periods for smart edge devices within a user's home based, at least in part on, a user's patterns for when they are likely to be home and/or turn on the devices, and account for long periods away such as vacations.

The ad-hoc systems 110 and the components thereof in the FIGS. 1 and 2 embodiments are assumed to be implemented using at least one processing platform, with each processing platform comprising one or more processing devices each having a processor coupled to a memory. Such processing devices can illustratively include particular arrangements of compute, storage and network resources. For example, as described herein, processing devices in some embodiments are implemented at least in part utilizing virtual resources such as VMs or containers (e.g., Linux containers (LXCs)), or combinations of both as in an arrangement in which Docker containers or other types of LXCs are configured to run on VMs.

The ad-hoc systems 110 (or one or more components thereof) may be implemented on respective distinct processing platforms, although numerous other arrangements are possible. For example, in some embodiments at least portions of one or more of the edge devices 130/230 are implemented on the same processing platform.

Additionally, at least portions of the ad-hoc systems 110 in some embodiments may be implemented as part of a cloud-based system. The ad-hoc systems 110 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between elements of the information processing system 100 may take place over one or more networks including network 104.

The term "processing platform" as used herein is intended to be broadly construed so as to encompass, by way of illustration and without limitation, multiple sets of processing devices and one or more associated storage systems that are configured to communicate over one or more networks. For example, distributed implementations of the ad-hoc systems 110 are possible, in which certain ones of the edge devices 130/230, for example, reside in one edge location in a first geographic location while other ones of the edge devices 130/230 reside in at least a second edge location in at least a second geographic location that is potentially remote from the first geographic location. Thus, it is possible in some implementations for different ones of edge devices 130/230 in an ad-hoc system 110 to reside in different geographic locations. Numerous other distributed implementations of the components of an ad-hoc system 110 are possible.

Additional examples of processing platforms utilized to implement portions of the system 100 and/or ad-hoc systems 110 in illustrative embodiments will be described in more detail below in conjunction with FIGS. 5 and 6.

It is to be understood that the particular set of elements shown in FIGS. 1 and 2 for coordinating the operation of edge devices are presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for coordinating the operation of edge devices will now be described in more detail with reference to the flow diagram of FIG. 4. It is to be understood that this particular process is only an example, and that additional or alternative processes coordinating the operation of edge devices can be carried out in other embodiments.

The process 400 as shown includes steps 402 through 404, and is suitable for use in the system 100 and/or ad-hoc systems 110 but is more generally applicable to other types of systems for coordinating the operation of edge devices. Other arrangements of system idle governors and edge devices and/or other system components can be configured to perform at least portions of one or more of the steps in other embodiments.

In step 402, a plurality of notifications corresponding to a plurality of workloads for a plurality of edge devices in a system are received. In one or more embodiments, the plurality of notifications are buffered at a governing device (e.g., system idle governor) and the plurality of edge devices retrieve the buffered plurality of notifications from the governing device. In step 404, the operation of the plurality of edge devices in the system to process the plurality of workloads is coordinated. The coordinating of the operation of the plurality of edge devices in the system comprises coordinating one or more times for changing a state of at least a subset of the plurality of edge devices from a first state corresponding to a first level of activity to a second state corresponding to a second level of activity. In some instances, the second level of activity may be higher than the first level of activity. For example, one or more times for waking at least the subset of the plurality of edge devices are coordinated. In other instances, the second level of activity may be lower than the first level of activity. For example, one or more times for putting at least the subset of the plurality of edge devices into a lower state of activity (e.g., into standby state from a state of higher activity) are coordinated. In one or more embodiments, a relative time is synchronized across the plurality of edge devices in the system.

The coordinating of the operation further comprises coordinating one or more times for the processing of the plurality of workloads by at least the subset of the plurality of edge devices in the system. The coordinating of the operation of the plurality of edge devices in the system is based, at least in part, on increasing a ratio of edge device performance to edge device power dissipation, and is also based, at least in part, on one or more constraints such as, for example, a type of respective ones of the plurality of edge devices in the system, priority of respective ones of the plurality of notifications and/or a threshold number of the plurality of notifications to be received before enabling the operation of the plurality of edge devices in the system. In accordance with some embodiments, the one or more constraints may also include power thresholds such that power dissipation associated with a wakeup event or workload execution exceeding a given threshold may result in a decision to not wakeup or operate edge device(s) 230 at a particular time. Depending on implementation, certain constraints may be given higher weight or priority over other constraints.

In one or more embodiments, metadata corresponding to the plurality of notifications is logged and is input to one or more machine learning models. The one or more machine learning models are configured to predict when new notifications for one or more of the plurality of edge devices will be issued, priority of respective ones of the plurality of notifications, dependencies between at least one of the plurality of notifications and the plurality of edge devices, one or more times for waking at least the subset of the plurality of edge devices which reduces a number of wakeup times for at least the subset of the plurality of edge devices and/or one or more times for the processing of the plurality of workloads which align with the one or more times for waking at least the subset of the plurality of edge devices.

Further inputs to the one or more machine learning models comprise, for example, a type of one or more of the plurality of edge devices in the system, a type of one or more of the plurality of notifications, and/or a predetermined priority of one or more of the plurality of notifications. In one or more embodiments, a current sleep level and/or one or more historical sleep levels of one or more of the plurality of edge devices in the system are also inputted to the one or more machine learning models.

Figure 4:
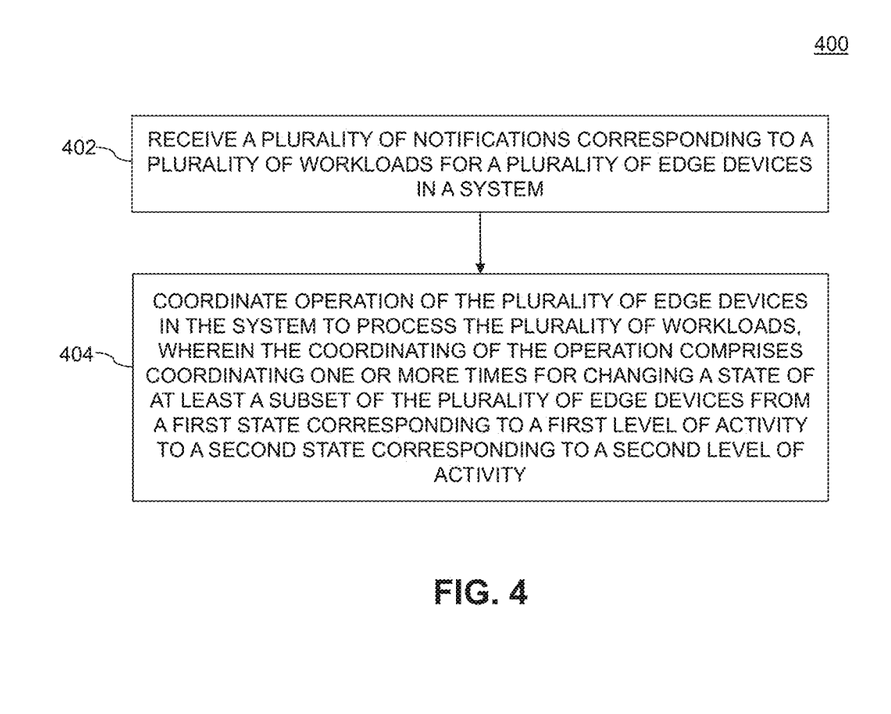
FIG. 4 is a flow diagram of an exemplary process for coordinating the operation of edge devices in an illustrative embodiment.

It is to be appreciated that the FIG. 4 process and other features and functionality described above can be adapted for use with other types of information systems configured to coordinate the operation of edge devices.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions that coordinate wakeup events for an edge device, or across edge devices in one or more systems or tiers of systems in order to reduce energy consumption. In an illustrative embodiment, energy consumption may be minimized. As noted herein, there are often power and cooling constraints at edge locations impacting edge devices and systems of edge devices. The embodiments provide technical solutions to coordinate the operation of edge devices so that edge devices in a system may effectively execute workloads in power-constrained environments.

The technical solutions provided herein align relative time across an ad-hoc system, including across system components such as, for example, edge devices, governing devices, prediction engines, sensors, buffers and/or controllers so that edge devices can achieve sleep states and only wake at advantageous times. The embodiments advantageously consider that edge device power consumption is more efficient at high loads and delay wakeup events and operations until the edge devices are determined to be highly loaded. The technical solutions described herein allow for the aggregation of workloads to operate the edge devices at higher loads and reduce power consumption.

As the number of edge devices in a network increases, their interactions, if uncontrolled, can lead to excess power consumption. Illustrative embodiments therefore provide technical solutions which increase coordination and efficiency at the system level. Advantageously, illustrative embodiments utilize a governing device to capture and buffer notifications corresponding to workloads and coordinate the workloads and wakeup periods for multiple edge devices.

As an additional advantage, the utilization of the embodiments in connection with edge device operation may be a criterion for edge device selection, purchasing decisions in collaborative or edge utility compute scenarios, and decisions on which edge devices to place workloads.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 and/or ad-hoc systems 110 may be implemented using one or more processing platforms. A given such processing platform comprises at least one processing device comprising a processor coupled to a memory. The processor and memory in some embodiments comprise respective processor and memory elements of a VM or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing or ad-hoc system comprise a cloud infrastructure including VMs and/or container sets implemented using a virtualization infrastructure that runs on a physical infrastructure. The cloud infrastructure further comprises sets of applications running on respective ones of the VMs and/or container sets. These and other types of cloud infrastructure can be used to provide what is also referred to herein as a multi-tenant environment. As mentioned previously, cloud infrastructure as disclosed herein can include cloud-based systems. VMs provided in such systems can be used to implement at least portions of one or more of a computer system and a cloud service provider in illustrative embodiments.

Illustrative embodiments of processing platforms utilized to implement functionality for coordinating the operation of edge devices will now be described in greater detail with reference to FIGS. 5 and 6. Although described in the context of system 100 or ad-hoc systems 110, these platforms may also be used to implement at least portions of other information processing systems in other embodiments.

Figure 5:
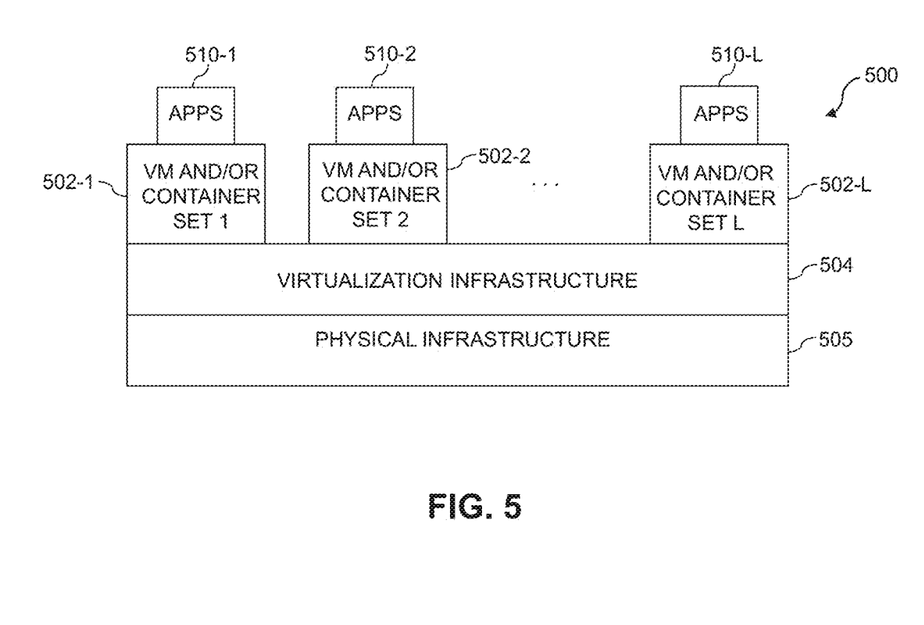
FIGS. 5 and 6 show examples of processing platforms that may be utilized to implement at least a portion of an information processing system in illustrative embodiments.
Figure 6:
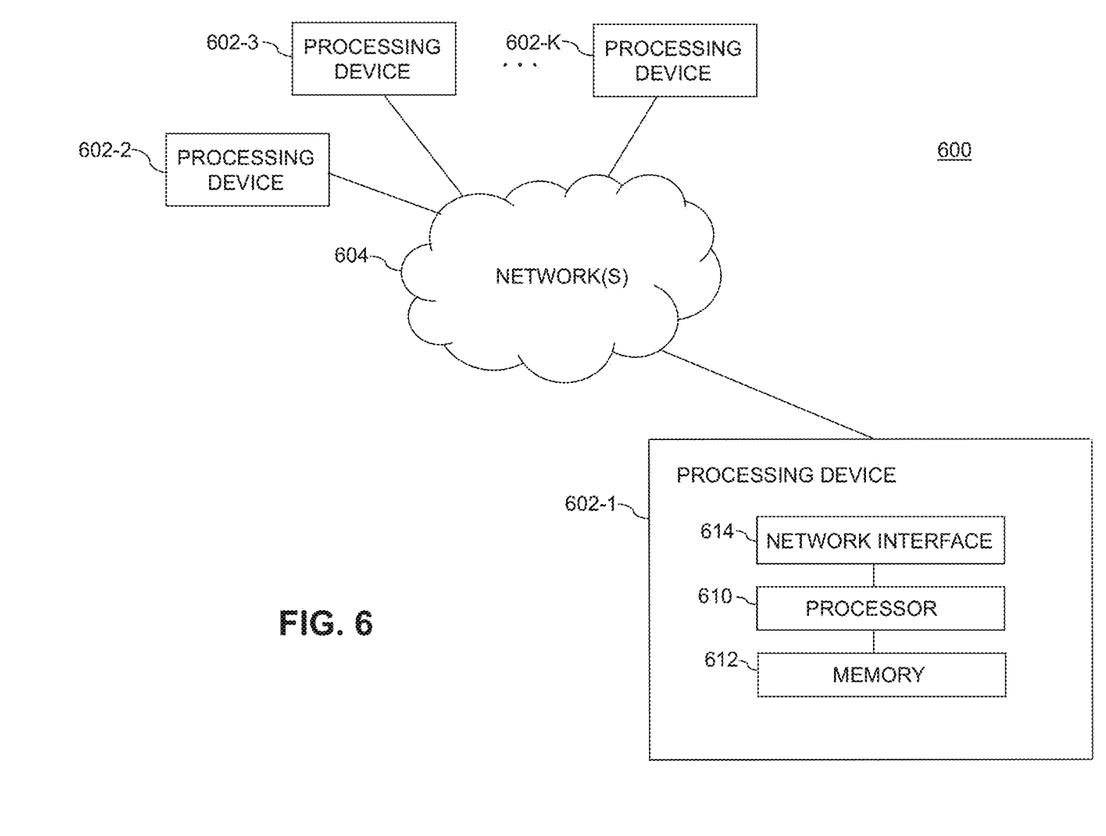

FIG. 5 shows an example processing platform comprising cloud infrastructure 500. The cloud infrastructure 500 comprises a combination of physical and virtual processing resources that may be utilized to implement at least a portion of the information processing system 100 and/or ad-hoc systems in FIGS. 1 and 2. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 or ad-hoc systems 110 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), an FPGA, a CPU, a GPU, a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 or ad-hoc systems 110 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing or ad-hoc system as disclosed herein can be implemented at least in part in the form of one or more software programs stored in memory and executed by a processor of a processing device. For example, at least portions of the functionality for coordinating the operation of edge devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, ad-hoc systems, edge devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
coordinating operation of a plurality of edge devices in a system to process a plurality of workloads;
wherein the coordinating of the operation of the plurality of edge devices in the system comprises:
coordinating one or more times for changing a state of at least a subset of the plurality of edge devices from a first state corresponding to a first level of activity to a second state corresponding to a second level of activity, wherein the one or more times for changing the state of at least the subset of the plurality of edge devices are based at least in part on limiting a number of state changes for at least the subset of the plurality of edge devices; and
coordinating one or more times for processing of the plurality of workloads by at least the subset of the plurality of edge devices in the system to align with the one or more times for changing the state of at least the subset of the plurality of edge devices from the first state to the second state;
wherein the method is performed by at least one processing device comprising a processor coupled to a memory.

2. The method of claim 1, further comprising buffering a plurality of notifications corresponding to the plurality of workloads for the plurality of edge devices in the system.

3. The method of claim 2, wherein the plurality of edge devices in the system are configured to retrieve the buffered plurality of notifications.

4. The method of claim 1, further comprising receiving a plurality of notifications corresponding to the plurality of workloads for the plurality of edge devices in the system, wherein the plurality of notifications comprise one or more of an alarm, a local message notification, a remote message notification, an update notification, and a sensor notification.

5. The method of claim 1, wherein the coordinating of the operation of the plurality of edge devices in the system is based, at least in part, on increasing a ratio of edge device performance to edge device power dissipation.

6. The method of claim 1, wherein the coordinating of the operation of the plurality of edge devices in the system is based, at least in part, on one or more constraints, wherein the one or more constraints comprise at least one of a type of respective ones of the plurality of edge devices in the system, priority of respective ones of a plurality of notifications corresponding to the plurality of workloads and a threshold number of the plurality of notifications to be received before enabling the operation of the plurality of edge devices in the system.

7. The method of claim 1, further comprising synchronizing a relative time across the plurality of edge devices in the system.

8. The method of claim 1, further comprising:
receiving a plurality of notifications corresponding to the plurality of workloads for the plurality of edge devices in the system; and
logging metadata corresponding to the plurality of notifications.

9. The method of claim 8, further comprising inputting the metadata to one or more machine learning models, wherein the one or more machine learning models are configured to predict at least one of when new notifications for one or more of the plurality of edge devices will be issued, priority of respective ones of the plurality of notifications, dependencies between at least one of the plurality of notifications and the plurality of edge devices, and one or more times for waking at least the subset of the plurality of edge devices which reduces a number of wakeup times for at least the subset of the plurality of edge devices.

10. The method of claim 9, further comprising inputting to the one or more machine learning models at least one of a type of one or more of the plurality of edge devices in the system, a type of one or more of the plurality of notifications, and a predetermined priority of one or more of the plurality of notifications.

11. The method of claim 9, further comprising inputting to the one or more machine learning models data comprising at least one of a current sleep level of one or more of the plurality of edge devices in the system and one or more historical sleep levels of the one or more of the plurality of edge devices in the system.

12. The method of claim 9, further comprising inputting to the one or more machine learning models historical data comprising state change events of one or more of the plurality of edge devices in the system.

13. The method of claim 9, wherein the one or more machine learning models are further configured to predict one or more times for the processing of the plurality of workloads which align with the one or more times for waking at least the subset of the plurality of edge devices.

14. An apparatus, comprising:
at least one processor and at least one memory storing computer program instructions wherein, when the at least one processor executes the computer program instructions, the apparatus is configured:
to coordinate operation of a plurality of edge devices in a system to process a plurality of workloads;

wherein, in coordinating of the operation of the plurality of edge devices in the system, the apparatus is configured:
to coordinate one or more times for changing a state of at least a subset of the plurality of edge devices from a first state corresponding to a first level of activity to a second state corresponding to a second level of activity, wherein the one or more times for changing the state of at least the subset of the plurality of edge devices are based at least in part on limiting a number of state changes for at least the subset of the plurality of edge devices; and
to coordinate one or more times for processing of the plurality of workloads by at least the subset of the plurality of edge devices in the system to align with the one or more times for changing the state of at least the subset of the plurality of edge devices from the first state to the second state.

15. The apparatus of claim 14, wherein the apparatus is further configured to buffer a plurality of notifications corresponding to the plurality of workloads for the plurality of edge devices in the system.

16. A computer program product stored on a non-transitory computer-readable medium and comprising machine executable instructions, the machine executable instructions, when executed, causing a processing device:
to coordinate operation of a plurality of edge devices in a system to process a plurality of workloads;
wherein, in coordinating of the operation of the plurality of edge devices in the system, the machine executable instructions cause the processing device:
to coordinate one or more times for changing a state of at least a subset of the plurality of edge devices from a first state corresponding to a first level of activity to a second state corresponding to a second level of activity, wherein the one or more times for changing the state of at least the subset of the plurality of edge devices are based at least in part on limiting a number of state changes for at least the subset of the plurality of edge devices; and
to coordinate one or more times for processing of the plurality of workloads by at least the subset of the plurality of edge devices in the system to align with the one or more times for changing the state of at least the subset of the plurality of edge devices from the first state to the second state.

17. The computer program product of claim 16, wherein the machine executable instructions further cause the processing device to buffer a plurality of notifications corresponding to the plurality of workloads for the plurality of edge devices in the system.

18. The computer program product of claim 16, wherein the coordinating of the operation of the plurality of edge devices in the system is based, at least in part, on increasing a ratio of edge device performance to edge device power dissipation.

19. The computer program product of claim 16, wherein the coordinating of the operation of the plurality of edge devices in the system is based, at least in part, on one or more constraints, wherein the one or more constraints comprise at least one of a type of respective ones of the plurality of edge devices in the system, priority of respective ones of a plurality of notifications corresponding to the plurality of workloads and a threshold number of the plurality of notifications to be received before enabling the operation of the plurality of edge devices in the system.

20. The apparatus of claim 14, wherein the coordinating of the operation of the plurality of edge devices in the system is based, at least in part, on increasing a ratio of edge device performance to edge device power dissipation.

* * * * *